United States Patent
Bosshart

(10) Patent No.: US 6,430,684 B1
(45) Date of Patent: Aug. 6, 2002

(54) PROCESSOR CIRCUITS, SYSTEMS, AND METHODS WITH EFFICIENT GRANULARITY SHIFT AND/OR MERGE INSTRUCTION(S)

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/431,562

(22) Filed: Oct. 29, 1999

(51) Int. Cl.[7] .................. G06F 9/305; G06F 9/308; G06F 9/315; G06F 9/345; G06F 7/06
(52) U.S. Cl. .............. 712/300; 712/225; 712/224; 712/223; 711/219; 711/212; 711/220; 711/214; 708/209; 708/490; 710/65; 710/66; 710/68; 710/127; 714/712
(58) Field of Search .................. 712/300, 221, 712/225, 223, 224; 711/219, 214, 212, 220; 710/65, 127, 66, 68; 714/712, 49, 812; 708/490, 525, 231, 233, 209, 212

(56) References Cited

U.S. PATENT DOCUMENTS

| 4,219,874 A | * | 8/1980 | Gusev et al. ............... 712/300 |
| 4,999,796 A | * | 3/1991 | DeWitt et al. ............... 708/209 |
| 5,495,598 A | * | 2/1996 | Byers et al. ................. 714/712 |
| 5,787,025 A | * | 7/1998 | Muwafi et al. ............. 708/490 |

* cited by examiner

Primary Examiner—Daniel H. Pan
(74) Attorney, Agent, or Firm—Robert D. Marshall, Jr.; W. James Brady, III; Frederick J. Telecky, Jr.

(57) ABSTRACT

A method of operating a processor (30). The method comprises a first step of fetching an instruction (20). The instruction includes an instruction opcode, a first data operand bit group corresponding to a first data operand ($D_1'$), and a second data operand bit group corresponding to a second data operand ($D_2'$). At least one of the first data operand and the second data operand consists of an integer number N bits (e.g., N=32). The instruction also comprises at least one immediate bit manipulation operand consisting of an integer number M bits, wherein $2^M$ is less than the integer number N. The method further includes a second step of executing the instruction, comprising the step of manipulating a number of bits of one of the first data operand and the second data operand. Finally, the number of manipulated bits is in response to the at least one immediate bit manipulation operand, and the manipulating step is further in response to the instruction opcode.

45 Claims, 4 Drawing Sheets

PROCESSOR CIRCUITS, SYSTEMS, AND METHODS WITH EFFICIENT GRANULARITY SHIFT AND/OR MERGE INSTRUCTION(S)

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to processors, and are more particularly directed to improving the availability and implementation of three operand shift and/or merge instructions and operations in such processors.

The present embodiments pertain to the ever-evolving fields of computer technology, microprocessors, and other types of processors. Processor devices are used in numerous applications, and their prevalence has led to a complex and demanding marketplace where efficiency of operation is often a key consideration, where such efficiency is reflected in price and performance of the processor. The following discussion and embodiments are directed to processor efficiency and functionality, and arise in the area of shift-merge instruction capability.

The prior art includes a number of bit manipulation instructions where each such instruction is implemented in certain processors because it permits data to be manipulated using a single instruction, whereas if the instruction is not part of the processor instruction set the same resulting data manipulation may require considerably more than one instruction. To demonstrate these types of instructions, four different examples are provided below. Before detailing those instructions, FIG. 1 introduces the basic instruction format of all of these instructions via a general instruction 10. Instruction 10 includes an opcode, which includes a number of bits forming a unique bit pattern which defines the specific type of instruction. Instruction 10 further includes references to two data operands, shown as data $D_1$ and data $D_2$. These references are commonly to corresponding registers and it is not intended therefore to demonstrate that these data are directly embedded in instruction 10. Additionally, for the sake of discussion and as a contemporary example, data $D_1$ and $D_2$ are typically 32-bit quantities stored in the registers and often there are 32 such registers; as a result, the references to data $D_1$ and $D_2$ are 5-bit identifiers which each identify a corresponding one of the 32 registers in which either data $D_1$ or data $D_2$ is stored. Instruction 10 also includes one or more bit manipulation arguments where for the examples provided below there is either two 5-bit arguments for a total of 10 bits, or a single 5-bit argument. Different arguments are discussed below based on a particular corresponding instruction, but typically the arguments relate to some parameter for manipulating data $D_1$ and $D_2$ such as a shift amount, a position, or a number of bits to be manipulated. As explored in more detail below, note that the argument(s) may be either immediate information (i.e., embedded within instruction 10) or addressed by the instruction so that they are read from a storage device (e.g., register). Finally, note that instruction 10 also includes a destination reference DEST, where this reference is also commonly to one of 32 registers and, hence, is also a five bit identifier. The DEST location is the register where the result of the operation of instruction 10 is written.

FIGS. 2a and 2b illustrate the operands and operation of a prior art INSERT instruction. FIG. 2a illustrates the two 32-bit data operands of the INSERT instruction, and which are shown as data A and B. The third operand of an INSERT instruction is a bit manipulation operand which provides two aspects, and in this regard is typically embodied as a 10-bit operand, where five of these bits define a SHIFT argument and the remaining five of these bits define a LENGTH argument. The SHIFT argument defines the number of bits that data A is to be right shifted, that is, shifted so that its most significant bit is shifted towards the original position of its least significant bit. Thus, FIG. 2a illustrates the right shifting of data A in response to the SHIFT argument by way of a right-pointing arrow, with the result following the shift being designated as $A_S$ in FIG. 2b. For example, if SHIFT equals six, then data A is shifted right by six bits with the result, $A_S$, starting at its least significant bit, having the 26 more significant bits from data A. Note that $A_S$ is shown in FIG. 2b only to demonstrate the functionality of the shift, and is not intended to suggest that an additional storage device or clock cycle is required to temporarily store the shifted value $A_S$. The LENGTH argument defines the number of bits that are taken from $A_S$ (i.e., the shifted value of A) and copied over the value of data B starting at the least significant bit of data B; for sake of reference, the LENGTH number of bits from $A_S$ and copied in this manner are shown as $A_{SL}$. Thus, FIG. 2b illustrates that a number of bits equal to LENGTH from $A_S$ are copied over data B, thereby creating a result R1 which includes a value $A_{SL}$ starting at bit 0 and continuing up to bit LENGTH-1. The remaining bits in result R1 are identical to the corresponding bit locations from data B. Given the preceding, it may be stated that a number of bits equal to LENGTH from $A_S$ are merged with data B and, thus, this is why the INSERT ins is a type of shift-merge instruction.

FIGS. 3a and 3b illustrate the operands and operation of a prior art DEPOSIT instruction. FIG. 3a illustrates the two 32-bit data operands of the DEPOSIT instruction, and which are shown as data C and D. The third operand of the DEPOSIT instruction is a bit manipulation operand which provides two aspects and also is typically embodied as a 10-bit operand, where five of these bits define a SHIFT argument and the remaining five of these bits define a LENGTH argument. The SHIFT argument defines the number of bits that data C is to be left shifted, that is, shifted so that its least significant bit is shifted towards the original location of its most significant bit. Thus, FIG. 3a illustrates the left shifting in response to the SHIFT argument by way of a left-pointing arrow, with the result following the shift being designated as $C_S$ in FIG. 3b. For example, if SHIFT equals four, then data C is shifted left by four bits with the result, $C_S$, starting at its least significant bit, having the 28 least significant bits from data C. Note that $C_S$ is shown in FIG. 3b only to demonstrate the functionality of the shift, and is not intended to suggest that an additional storage device or clock cycle is required to temporarily store the shifted value $C_S$. The LENGTH argument defines the number of bits that are taken from $C_S$ (i.e., the shifted value of C) and copied over or "merged with" the value of data D starting at bit location SHIFT and continuing, therefore, up to bit location SHIFT+LENGTH-1; for sake of reference, the LENGTH number of bits from $C_S$ are shown as $C_{SL}$. Thus, FIG. 3b illustrates that $C_{SL}$ is copied over the corresponding bit locations in data D, thereby creating a result R2 which includes a value $C_{SL}$ starting at bit SHIFT and continuing up to bit SHIFT+LENGTH−1. The remaining bits in result R3 are identical to the corresponding bit locations from data C, and appear in both the upper and lower bit locations of result R2 (assuming SHIFT is greater than zero and less than 32).

FIGS. 4a and 4b illustrate the operands and operation of a prior art REPLACE instruction. FIG. 4a illustrates the two 32-bit data operands of the REPLACE instruction, and which are shown as data E and F. The third operand of the REPLACE instruction is a bit manipulation operand which provides two aspects and also is typically embodied as a 10-bit operand, where five of these bits define a POSITION argument and the remaining five of these bits define a LENGTH argument. The POSITION argument defines a bit position in data E, and the LENGTH argument defines a number of bits that are copied from data E starting at the POSITION bit. More particularly, these copied bits form a quantity shown in FIG. 4b as $E_L$, and they are copied over the value of data F starting at the POSITION bit. Thus, FIG. 4b illustrates that $E_L$ is copied over the corresponding bit locations in data F, thereby creating a merged result R3 which includes a value $E_L$ starting at bit POSITION and continuing up to bit POSITION+LENGTH−1. The remaining bits in result R3 are identical to the corresponding bit locations from data F, and appear in both the upper and lower bit locations of result R3 (assuming POSITION is greater than zero and less than 31).

FIGS. 5a and 5b illustrate the operands and operation of a prior art FUNNEL-SHIFT instruction. FIG. 5a illustrates the two 32-bit data operands of the FUNNEL-SHIFT instruction, and which are shown as data G and H. For the FUNNEL-SHIFT instruction, the two 32-bit operands are concatenated, as also shown in FIG. 5a. The third operand of the FUNNEL-SHIFT instruction is a bit manipulation operand which provides only a single aspect and is typically embodied as a 5-bit operand, where the five bits define a SHIFT argument. The SHIFT argument defines the number of bits that both data G and H are right shifted (i.e., so that the most significant bits of each are shifted towards the original location of their respective least significant bits). Thus, FIG. 5a illustrates the right shifting in response to the SHIFT argument by way of a right-pointing arrow, with a result R4 shown in FIG. 5b. Result R4 is a 32-bit result which includes the values of data G and H after the right shift, and designated as $G_S$ and $H_S$, respectively. Further, note that the 32-bit result R4 of the FUNNEL-SHIFT instruction starts at its least significant bit position with the bit position of data G that is equal to the shift amount. For example, if SHIFT equals five, then data G is right-shifted five positions and, thus, bits $G_0$ through $G_4$ are shifted out such that $G_S$ in result R4 begins, at its least significant bit location, with bit $G_5$ and includes the remainder of the bits from data G up to $G_{31}$. Further, since data H is also right shifted, then $H_S$ in result R4 includes the bits of H from $H_0$ up to $H_{0+SHIFT-1}$; again by way of example if SHIFT equals five, then $H_S$ includes bits $H_0$ through $H_4$.

The present inventor has made various observations given the operations and functionality provided by the preceding instructions, and these observations provide further introduction to the preferred embodiments described later. As a first observation, the 10-bit value for any of the INSERT, DEPOSIT, and REPLACE instructions, as well as the 5-bit value for the FUNNEL-SHIFT instruction, may be an immediate operand within each instruction. Alternatively, these values may be provided as read data, such as from a register or memory location. However, for either the approach of an immediate operand or the approach of a read value, there are drawbacks, as further detailed below.

When the 10-bit or 5-bit value for any of the INSERT, DEPOSIT, REPLACE, and FUNNEL-SHIFT instructions is provided by an external read (e.g., from a register file), this requires an additional read port on the device being read. More specifically, for the three operand instruction described above, the external read involves a first data operand, a second data operand, and the 10-bit (or 5-bit) value as a third operand, thereby requiring a total of three read ports. Such an additional port can be very expensive in terms of space and actual device cost. Typically, the cost of a register file tends to increase as the square of the number of read ports and, thus, an additional port for a third operand can be burdensome and potentially prohibitive in many processor implementations. Still further, a requirement for externally reading this third ported value requires an additional set of forwarding multiplexers between the register file and the circuits capable of reading the port. Finally, assuming that the external read is from a register file containing 32 registers (i.e., a common implementation), then the instruction must include a 5-bit field to address one of these 32 registers, thereby requiring five bit positions in the instruction to achieve this addressing functionality.

When the 10-bit or 5-bit value for any of the INSERT, DEPOSIT, REPLACE, and FUNNEL-SHIFT instructions is embedded in the instruction as an immediate value, then the instruction necessarily is increased in size, by either ten bits for the INSERT, DEPOSIT, and REPLACE instructions, or by five bits for the FUNNEL-SHIFT instruction. This number of bits can considerably increase the amount of opcode space required to accommodate the processor instruction set. Indeed, because of this potential additional opcode space, many processors do not include these bit-manipulation instructions.

In view of the above, there arises a need to address the drawbacks of the limitations of the prior art bit manipulation instructions and their functionality, as is accomplished by the preferred embodiments described in the remainder of this document.

BRIEF SUMMARY OF THE INVENTION

In the preferred embodiment, there is a method of operating a processor. The method comprises a first step of fetching an instruction. The instruction includes an instruction opcode, a first data operand bit group corresponding to a first data operand ($D_1$'), and a second data operand bit group corresponding to a second data operand ($D_2$'). At least one of the first data operand and the second data operand consists of an integer number N bits. The instruction also comprises at least one immediate bit manipulation operand consisting of an integer number M bits, wherein $2^M$ is less than the integer number N. The method further includes a second step of executing the instruction, comprising the step of manipulating a number of bits of one of the first data operand and the second data operand. Finally, the number of manipulated bits is in response to the at least one immediate bit manipulation operand, and the manipulating step is further in response to the instruction opcode. Other circuits, systems, and methods are also disclosed and claimed.

DETAILED DESCRIPTION OF THE INVENTION

FIGS. 1 through 5b were discussed in the Background Of The Invention section above and the reader is assumed familiar with that discussion.

Figure 1:
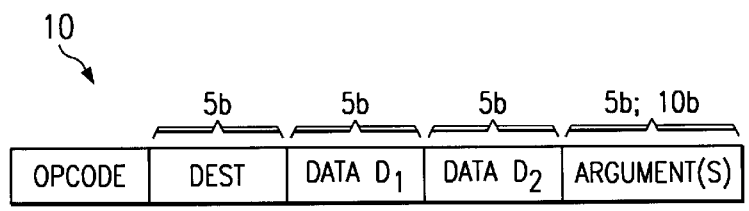
FIG. 1 illustrates a prior art shift and/or merge instruction in general.
Figure 2A:
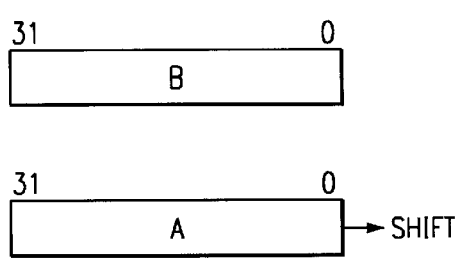
FIG. 2a illustrates the two data operands of a prior art INSERT instruction, where the data A operand is right-shifted.
Figure 2B:
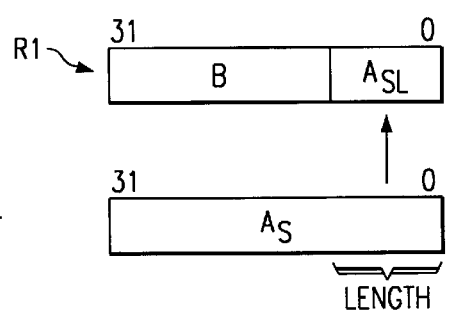
FIG. 2b illustrates the data A operand of FIG. 2a following the right shift, and further illustrates the result of the INSERT instruction after the right-shifted value is copied over the least significant bit(s) of the data B operand.
Figure 3A:
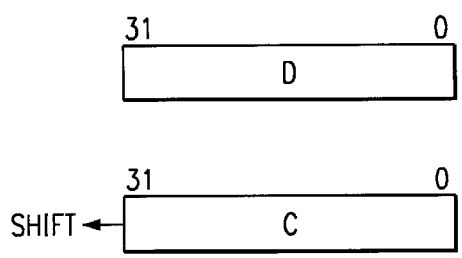
FIG. 3a illustrates the two data operands of a prior art DEPOSIT instruction, where the data C operand is to be left-shifted.
Figure 3B:
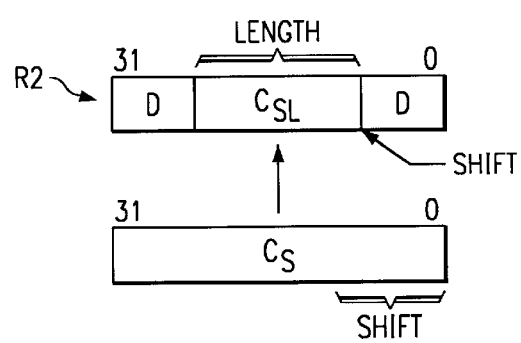
FIG. 3b illustrates the data C operand of FIG. 3a following the left shift, and further illustrates the result of the DEPOSIT instruction after the left-shifted value is copied over selected bits of the data D operand.
Figure 4A:
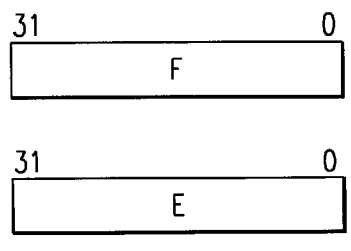
FIG. 4a illustrates the two data operands of a prior art REPLACE instruction.
Figure 4B:
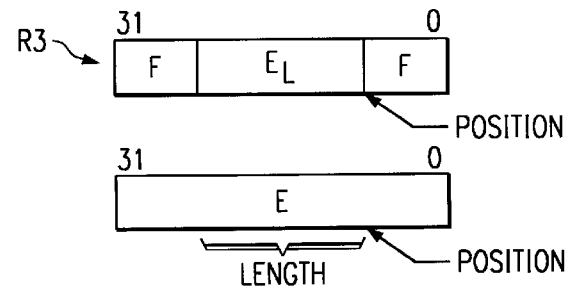
FIG. 4b illustrates the data E operand of FIG. 4a where a POSITION and LENGTH are defined with respect thereto, and further illustrates the result of the REPLACE instruction after the LENGTH bits of data E starting from the POSITION bit are copied over corresponding bit locations of the data F operand.
Figure 5A:
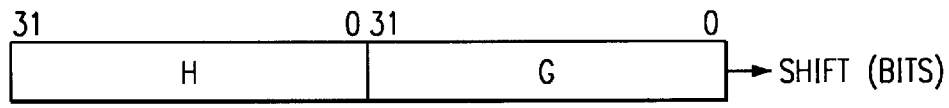
FIG. 5a illustrates the two data operands of a prior art FUNNEL-SHIFT instruction, where the data G and H operands are to be right-shifted.
Figure 5B:
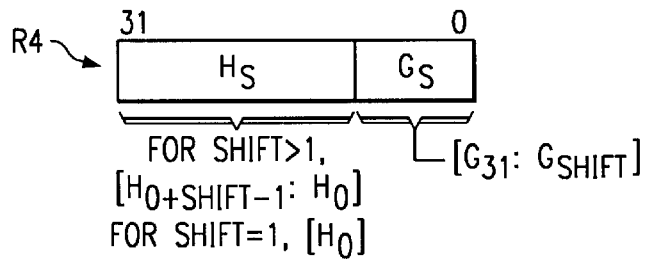
FIG. 5b illustrates the data G and H operands of FIG. 5a following the right shift, and further illustrates the result of the FUNNEL-SHIFT instruction as the 32 least significant bits of the right-shifted value.
Figure 6:
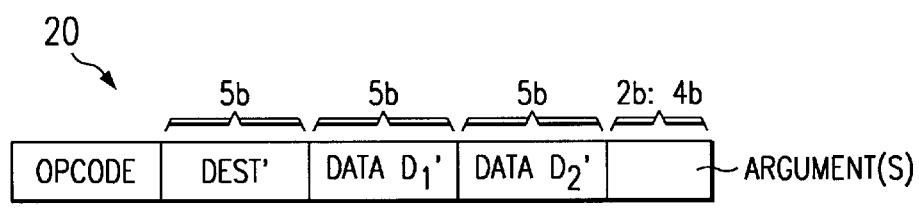
FIG. 6 illustrates a shift and/or merge instruction in accordance with the preferred embodiment.

FIG. 6 illustrates a basic instruction format 20 for a three operand bit manipulation instruction in accordance with the preferred embodiment. Instruction 20 includes an opcode, which like the prior art includes a number of bits whereby the bit pattern defines the specific type of instruction. Instruction 20 further includes references to two data operands also like the prior art, shown as data $D_1'$ and data $D_2'$ (where apostrophes are used here to avoid confusion with the data operands discussed earlier). These data operand references are preferably to a register, and it is not intended therefore to demonstrate that these data are directly embedded in instruction 20. However, in an alternative embodiment, it is possible albeit less likely that one of the operands, particularly if it is less than 32 bits in length, may be immediate data located in the instruction. Thus, in either event instruction 20 includes two groups of bits, one corresponding to data $D_1'$ and another corresponding to data $D_2'$, where each group either references the operand (e.g., in a register) or is the actual operand. Despite these various alternatives, for consistency with the prior discussion and as a contemporary example, data $D_1'$ and $D_2'$ are discussed in the examples of this document as 32-bit quantities stored in registers. Instruction 20 also includes is a bit manipulation operand which consists of one or two immediate arguments. In the preferred embodiment, each of these arguments is a 2-bit argument, and thus a total of two bits are used when only a single argument is embedded within instruction 20 and a total of four bits are used when two 2-bit arguments are embedded within instruction 20. The choice of either one or two arguments depends on the type of the bit manipulation instruction, and which is defined by the instruction opcode. Finally, and also like the prior art, instruction 20 also includes a destination reference DEST', where this reference is also commonly to one of 32 registers and, hence, is also a five bit identifier. The DEST' location is the register where the result of the operation of instruction 20 is written.

Figures 7A, 7B:
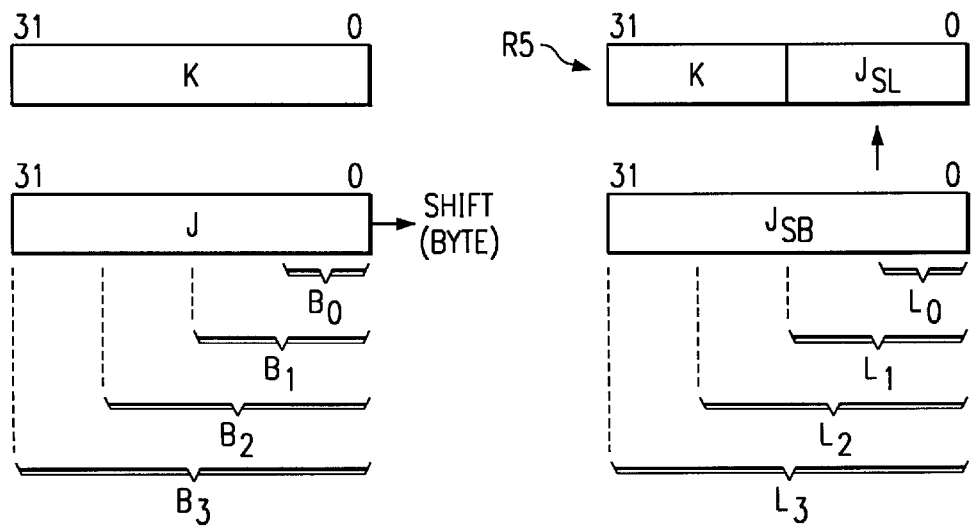
FIG. 7a illustrates the two data operands of an inventive prior art INSERT instruction, where the data J operand is right-shifted on a byte basis.
FIG. 7b illustrates the data J operand of FIG. 7a following the right shift, and further illustrates the result of the inventive INSERT instruction after the right-shifted value is copied over the least significant byte(s) of the data K operand.

To further develop the implementation and inventive aspects of instruction 20 from FIG. 6, FIGS. 7a and 7b illustrate the operation of instruction 20 as implemented where its opcode calls for an inventive INSERT instruction. FIG. 7a illustrates the two 32-bit data operands of the inventive INSERT instruction, and are shown as data J and K. The third operand of the inventive INSERT instruction is a bit manipulation operand which provides the same two aspects as the prior art aspect, but does so using a lesser number of bits and thereby gives rise to a distinctive functionality as is now explored. Specifically, for instruction 20 as implemented to achieve an inventive INSERT instruction, a first inventive 2-bit immediate operand defines a SHIFT argument and a second inventive 2-bit operand defines a LENGTH argument. The SHIFT argument defines the number of bytes that data J is right shifted, that is, shifted so that its most significant byte is shifted towards the original position of its least significant byte. Thus, FIG. 7a illustrates the right shifting in response to the SHIFT argument by way of a right-pointing arrow, where four different byte shift positions $B_0$ through $B_3$ are illustrated so that the 2-bit SHIFT argument may be understood to identify any one of these four positions. Further, the result following the byte(s) shift is designated in FIG. 7b as $J_{SB}$. For example, if SHIFT equals one, then data J is shifted right by one byte (i.e., byte position $B_0$) with the result, $J_{SB}$, starting at its least significant byte, having the three more significant bytes data J. $J_{SB}$ is shown in FIG. 7b only to demonstrate the functionality of the shift, and is not intended to suggest that an additional storage device or clock cycle is required to temporarily store the shifted value $J_{SB}$. The inventive 2-bit LENGTH argument defines the number of bytes that are taken from $J_{SB}$ (i.e., the shifted value of J) and copied over the value of data K starting at the least significant byte of data K. Accordingly, the inventive 2-bit LENGTH argument may define one of four byte-aligned lengths, shown in FIG. 7b as lengths $L_0$ through $L_3$. For sake of reference, the LENGTH number of bytes from $J_{SB}$ and merged with data K are shown in FIG. 7b as $J_{SL}$. Further, by way of example FIG. 7b illustrates that the 2-bit LENGTH argument specifies that two bytes from the shifted value of $J_{SB}$ are copied over the two least significant bytes of data K, thereby creating a result R5 which includes a value $J_{SL}$ starting at bit 0 and having LENGTH bytes of $J_{SB}$. The remaining bytes in result R5 are identical to the corresponding byte locations from data K. Thus, it may be stated that a number of bytes equal to LENGTH from $J_S$ are merged with data K.

From the preceding discussion of FIGS. 7a and 7b, one skilled in the art should appreciate that the functionality in connection with the inventive INSERT instruction permits a three operand manipulation as does the prior art INSERT instruction; however, the inventive INSERT instruction performs its shift and merge functionality on a byte-aligned basis, which in the digital data art is sometimes referred to as using byte granularity. The selection of byte granularity in the preferred embodiment is selected in view of additional observations made by the present inventor, as discussed below.

As a first consideration relative to the preferred embodiment use of byte granularity in the inventive shift and/or merge instruction, recall that the Background Of The Invention section above detailed that the prior art shift and/or merge instructions are very demanding in the number of bits required to implement the instruction. In contrast, the preferred embodiment permits a 3-operand shift and/or merge operation with far fewer bits. For example, looking to the number of bits in the arguments of instructions 10 and 20, it is readily observed that instruction 10 requires six more bits for its arguments than does instruction 20 (i.e., 10 bits for instruction 10 minus 4 bits for instruction 20). This six bit reduction is extremely important in terms of Boolean space required to implement an instruction in a processor. Specifically, as demonstrated by mapping a set of bits into Boolean space such as by use of a Karnaugh map, it may be shown that each bit added to an instruction doubles the amount of Boolean space required to implement the instruction. Conversely, a reduction by one bit in an instruction reduces in half the amount of Boolean space required to implement the instruction. As a result, therefore, a six bit reduction as is achieved by the present embodiment permits an inventive INSERT instruction to be implemented using $1/64^{th}$ of the Boolean space (i.e., space reduction of ½ per bit, then for six bits equals $(1/2)^6=1/64$) required by a prior art INSERT instruction having two 5-bit arguments. Given the drastic reduction in space requirements, the inventive INSERT instruction as well as the instructions discussed below are much more readily implemented into processors thereby increasing the availability of such instructions to programmers of those processors and, consequently, improving processing efficiency.

As a second consideration relative to the preferred embodiment use of byte granularity in the inventive shift and/or merge instruction, note that the byte granularity is not as flexible in its functionality as is the individual bit granularity achieved by the prior art, but the present inventor has observed that this limitation is reduced or indeed not a limitation for those types of processing that operate on byte or half-word (i.e., two bytes) basis. For example, in many contemporary processors constructed to perform single instruction multiple data ("SIMD") operations, such as processors supporting multimedia extensions, often there are video or multimedia operations which for the majority of their operations involve byte-based manipulations. Accordingly, the inventive INSERT instruction described above may be readily implemented into such processors and thereby make available the byte granularity functionality of the inventive INSERT instruction. As another example, many contemporary communications applications, such as packing data for communication in a stream, also include operations involving byte-based manipulations. Once more, therefore, such applications will benefit from the inventive INSERT instruction and its functionality, without the additional burden and complexity required by the prior art INSERT instruction. Finally, these aspects also apply to the additional inventive instructions and functionality provided below.

Figure 8A:
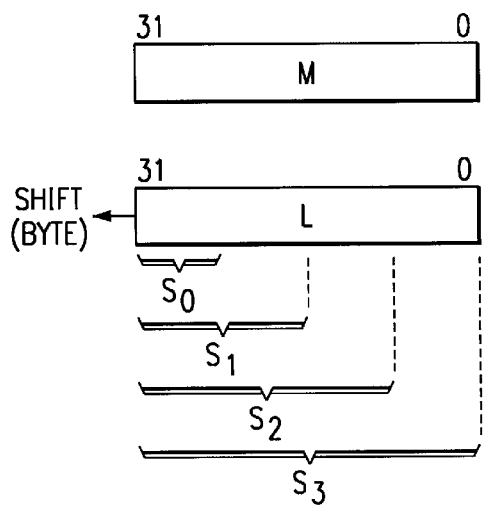
FIG. 8a illustrates the two data operands of an inventive DEPOSIT instruction, where the data L operand is to be left-shifted.
Figure 8B:
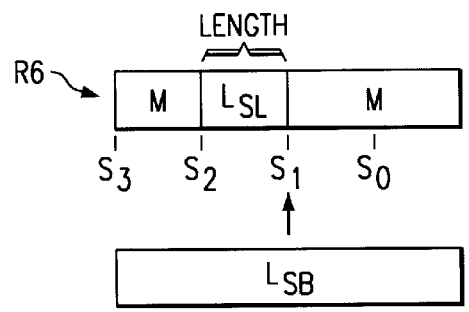
FIG. 8b illustrates the data L operand of FIG. 8a following the left shift, and further illustrates the result of the inventive DEPOSIT instruction after the left-shifted value is copied over selected bits of the data M operand.

FIGS. 8a and 8b illustrate the operation of instruction 20 as implemented where its opcode bits specify an inventive DEPOSIT instruction. FIG. 8a illustrates the two 32-bit data operands of the inventive DEPOSIT instruction, and are shown as data L and M. The third operand of the inventive DEPOSIT instruction is a bit manipulation operand which is an immediate operand and preferably provides the same two aspects as the prior art DEPOSIT instruction, but consistent with FIG. 6 the inventive DEPOSIT instruction uses two 2-bit arguments rather than two 5-bit arguments. Specifically, for instruction 20 as implemented to achieve an inventive DEPOSIT instruction, a first inventive 2-bit immediate operand defines a SHIFT argument and a second inventive 2-bit argument defines a LENGTH argument. The SHIFT argument defines the number of bytes that data L is left shifted, that is, shifted so that its least significant bytes is shifted towards the original location of its most significant byte. Thus, FIG. 8a illustrates the left shifting in response to the SHIFT argument by way of a left-pointing arrow, where four different shift positions $S_0$ through $S_3$ are illustrated so that the 2-bit SHIFT argument may be understood to identify any one of these four positions. Further, the result following the byte shift is designated as $L_{SB}$ in FIG. 8b. For example, if SHIFT equals two, then data L is shifted left by two bytes with the result, $L_{SB}$, starting at its least significant bit, having the two least significant bytes from data L. Note that $L_{SB}$ is shown in FIG. 8b only to demonstrate the functionality of the shift, and is not intended to suggest that an additional storage device or clock cycle is required to temporarily store the shifted value $L_{SB}$. The LENGTH argument defines the number of bytes that are taken from $L_{SB}$ and copied over (i.e., merged into) the value of data M starting at the SHIFT byte location, thereby providing a result R6. Thus, in connection with result R6 FIG. 8b also illustrates the four corresponding byte-aligned shift positions $S_0$ through $S_3$, since the merged data is inserted starting at the location identified by the SHIFT argument. By way of example, FIG. 8b illustrates the instance where SHIFT equals two, and the LENGTH designates that one byte is to be merged from $L_{SB}$ into data M, with the merged data shown as $L_{SL}$. The remaining bytes in result R6 are identical to the corresponding byte locations from data M, and appear in both the upper and lower byte locations of result R6 (assuming SHIFT is greater than zero and less than three).

Figure 9A:
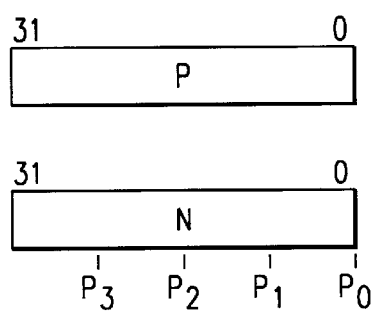
FIG. 9a illustrates the two data operands of an inventive REPLACE instruction.
Figure 9B:
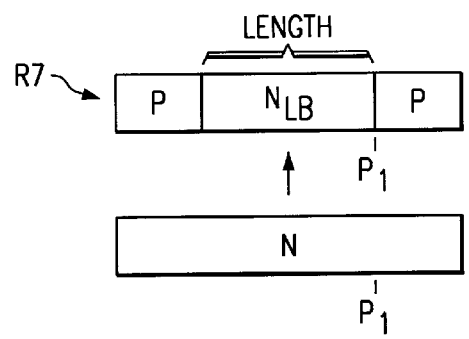
FIG. 9b illustrates the data N operand of FIG. 4a where a POSITION and LENGTH are defined with respect thereto, and further illustrates the result of the inventive REPLACE instruction after the LENGTH byte(s) of data N starting from the POSITION bit are copied over s corresponding byte location(s) of the data P operand.

FIGS. 9a and 9b illustrate the operation of instruction 20 as implemented where its opcode bits specify an inventive REPLACE instruction. FIG. 9a illustrates the two 32-bit data operands of the inventive REPLACE instruction, and which are shown as data N and P. The third operand of the inventive REPLACE instruction is an immediate bit manipulation operand and preferably provides the same two aspects as the prior art REPLACE instruction, but again consistent with FIG. 6 the inventive REPLACE instruction uses two 2-bit arguments rather than two 5-bit arguments. Specifically, for instruction 20 as implemented to achieve an inventive REPLACE instruction, a first inventive 2-bit immediate operand defines a POSTITION argument and a second inventive 2-bit argument defines a LENGTH argument. The POSTITION argument defines a byte position in data N, shown in FIG. 9a as occurring at one of four positions $P_0$ through $P_3$. The LENGTH argument defines a number of bytes that are copied from data N starting at the POSITION location. More particularly, these copied byte(s) form a quantity shown in FIG. 9b as $N_{LB}$, and they are copied over the value of data P starting at the POSITION location. Thus, FIG. 9b illustrates that $N_{LB}$ is copied over the corresponding byte locations in data P, thereby creating a merged result R7 which includes a value $N_{LB}$ starting at bit POSITION and LENGTH byte(s) from N. The remaining bytes in result R7 are identical to the corresponding bit locations from data P.

Figure 10A:
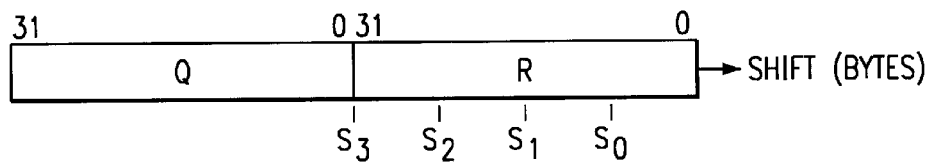
FIG. 10a illustrates the two data operands of an inventive FUNNEL-SHIFT instruction, where the Q and R operands are to be right-shifted by one or more bytes.
Figure 10B:
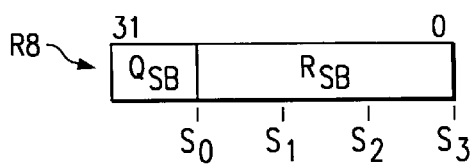
FIG. 10b illustrates the Q and R operands of FIG. 10a following the right shift, and further illustrates the result of the FUNNEL-SHIFT instruction as the four least significant bytes of the right-shifted value.

FIGS. 10a and 10b illustrate the operation of instruction 20 as implemented where its opcode bits specify an inventive FUNNEL-SHIFT instruction. FIG. 10a illustrates the two 32-bit data operands of the inventive FUNNEL-SHIFT instruction, and which are shown as data Q and R and which are concatenated, as also shown in FIG. 10a. The third operand of the inventive FUNNEL-SHIFT instruction is an immediate bit manipulation operand which is preferably two bits and defines a SHIFT argument. The SHIFT argument defines the number of bytes that both data Q and R are right shifted, that is, so that the most significant byte(s) of each are shifted towards the original location of their respective least significant byte(s). Thus, FIG. 10a illustrates the right shifting in response to the SHIFT argument by way of a right-pointing arrow, and with four shift positions $S_0$ through $S_3$ that may be identified by the 2-bit SHIFT argument. A result R* following the shift is shown in FIG. 10b, which includes the values of data Q and R after the right shift, and designated as $Q_{SB}$ and $R_{SB}$, respectively. Further, note that the 32-bit result R8 of the inventive FUNNEL-SHIFT instruction starts at its least significant byte position with the byte position of data Q that is equal to the byte shift amount. For example, if SHIFT equals one as shown in FIG. 10b, data R is right-shifted one byte position and, thus, bits $R_0$ through $R_7$ are shifted out such that $R_S$ in result R8 begins, at its least significant bit location, with bit $R_8$ of the second original byte of data R, and includes the remainder of the bytes from data R. Further, since data Q is also right shifted, then $Q_{SB}$ in result R8 includes the bytes of Q from $Q_0$ up to $Q_{0+([SHIFT*8]-1)}$; again by way of example if SHIFT equals one, then $Q_{SB}$ includes bits $Q_0$ through $Q_7$.

Figure 11:
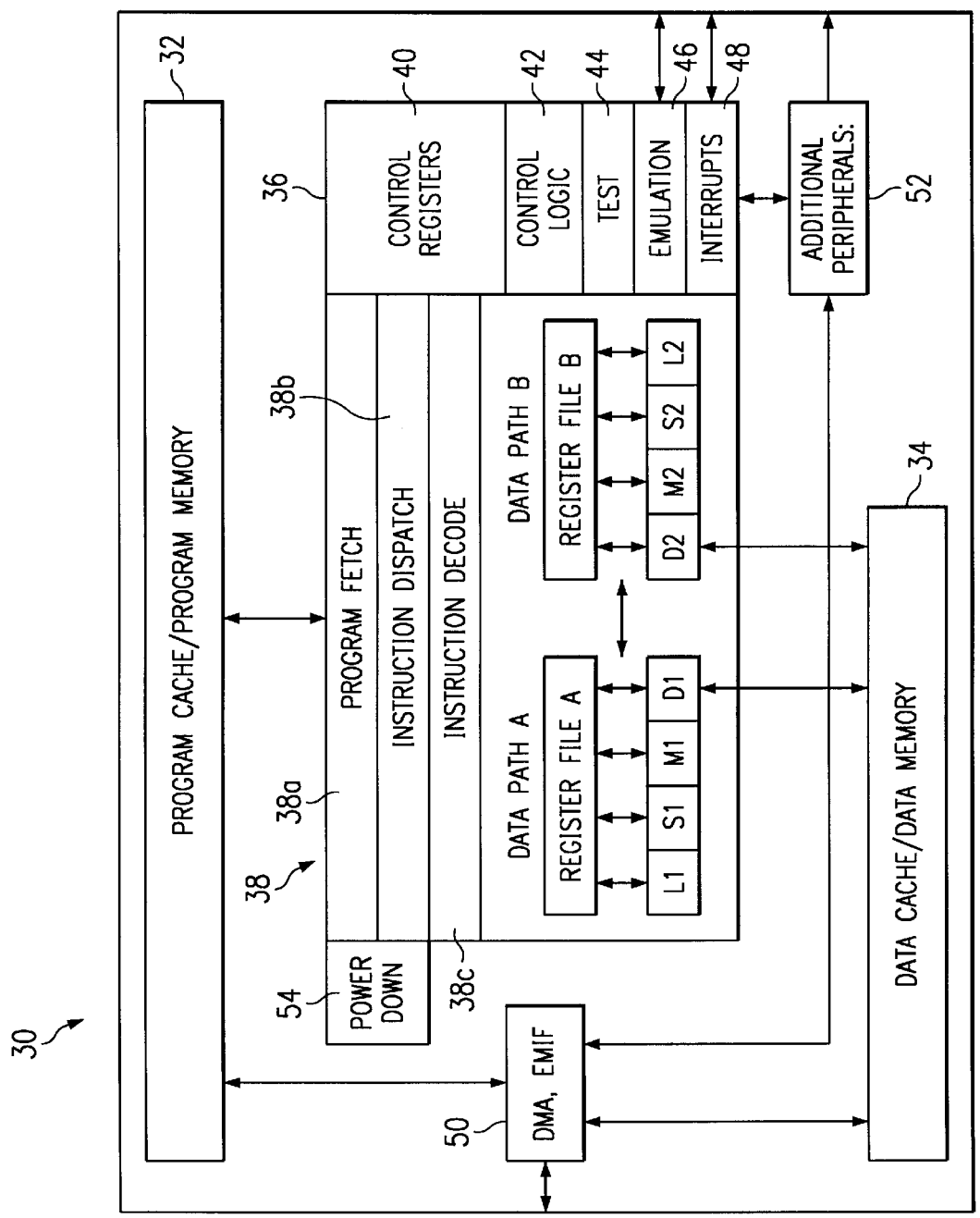
FIG. 11 illustrates a block diagram of a processor in which the preferred embodiments may be implemented.

FIG. 11 illustrates a block diagram of a processor 30 in which one or more of the previously described inventive instructions may be implemented, thereby permitting a more efficient three operand shift and/or merge operation in response to such instruction. Processor 30 is preferably a single integrated circuit and is shown in block form so as to simplify the illustration and discussion in the context of the instructions described above, while one skilled in the art will readily appreciate that additional details arise from the blocks shown as pertaining to processor operation and functionality. Further, processor 30 typifies a processor from the TMS320 C6000 series of processors commercially available from Texas Instruments Incorporated, including the TMS320C62x/C67x digital signal processors.

Turning to processor 30, it includes a program memory 32, which on some devices can be used as a program cache. Processor 30 also includes a data memory 34. Memories 32 and 34 are coupled to communicate with a central processing unit ("CPU") 36, which includes a pipeline 38 having various stages shown as a program fetch unit 38a, an instruction dispatch unit 38b, and an instruction decode unit 38c. The pipeline of CPU 36 further includes two data paths shown as path A and path B, where each data path has a corresponding set of four functional units (L1, S1, M1, and D1 for path A and L2, S2, M2, and D2 for path B). Briefly, the operational functionality of the functional units is set forth in the following Table 1, where additional functionality may be added or removed from each unit according to a given implementation:

TABLE 1

| Functional Unit | Fixed-point operations | Floating-point operations |
| --- | --- | --- |
| L | 32/40-bit arithmetic and compare operations | Arithmetic operations |
| | Leftmost 1 or 0 bit counting for 32 bits | DP→SP, INT→DP, INT→SP |
| | Normalization count for 32 and 40 bits | conversion operations |
| | 32-bit logical operations | |
| S | 32-bit arithmetic operations | Compare |
| | 32/40-bit shifts and 32-bit bit-field operations | Reciprocal and reciprocal square-root operations |
| | 32-bit logical operations | Absolute value operations |
| | Branches | SP→DP conversion operations |
| | Constant generation | |
| | Register transfer to/from the control register file (S2 only) | |
| M | 16 by 16 multiply operations | 32 by 32 bit fixed-point multiply operations |
| | | Floating-point multiply operations |
| D | 32-bit add, subtract, linear and circular address calculation | Load doubleword with 5-bit constant offset |
| | Loads and stores with a 5-bit constant offset | |
| | Loads and stores with 15-bit constant offset (D2 only) | |

Each set of functional units may communicate with a corresponding data path register file (shown as Register file A and Register file B), where each register file includes 32 32-bit registers. While not shown some of these communications also include cross-coupled paths whereby some functional units from path A may read Register file B while some functional units from path B may read Register file A. CPU 36 also includes additional supporting hardware, including a control register 40, control logic 42, test logic 44, emulation logic 46, and interrupt logic 48. Processor 30 also may include additional blocks such as a direct memory access ("DMA")/external memory interface ("EMIF") block 50 for performing the functions corresponding to these identifiers. Processor 30 also includes a peripheral block 50 which may support connection to various peripherals, including by way of example, timers, serial port(s), and a host-port interface. Finally, processor 30 includes a power down logic block 54 that can halt CPU activity, peripheral activity, and phase locked loop (PLL) activity to reduce power consumption.

The operation of processor 30 is now described in connection with the aspect of instruction treatment in the pipeline so that it may be further appreciated how the inventive shift and/or merge instructions detailed above provide their functionality in processor 30, again by way of example. Together, program fetch unit 38a, instruction dispatch unit 38b, and instruction decode unit 38, can deliver up to eight 32-bit instructions to the functional units every CPU clock cycle. The processing of the instructions occurs in each of the two data paths (A and B), and recall each of these paths contains four functional units (L, S, M, and D) and 32 32-bit general-purpose registers. To further illustrate the pipeline operation of processor 30, below such operation is described relative to the 'C62x by way of example.

Looking to fetch unit 38a, it uses a fetch packet of eight instructions. All eight of the instructions proceed through fetch processing together, which consists of four phases (program address generate phase, program address send phase, program access ready wait phase, and program fetch packet receive phase). During the program address generate phase, the program address is generated in the CPU. In the program address send phase, the program address is sent to memory. In the program address send phase, a memory read occurs. Finally, in the program address send phase, the fetch packet is received at the CPU.

Looking to instruction dispatch unit 38b and instruction decode unit 38c, in dispatch unit 38b the fetch packets are split into execute packets. Execute packets consist of one instruction or from two to eight parallel instructions. Dispatch unit 38b also assigns the instructions in an execute packet to the appropriate functional units. In the operation of instruction decode unit 38c, the source registers, destination registers, and associated paths are decoded for the execution of the instructions in the functional units. Thereafter, for a given clock cycle, each functional unit that was assigned an instruction executes the instruction; given that an execute packet may include up to eight instructions, then in a single clock (and execution) cycle, these up to eight instructions may be executed. If an execute packet has less than eight instructions, the remaining slots of the packet that do not have a corresponding instruction are treated as no operation instructions ("NOPs"), and the NOP(s) is not dispatched to a functional unit because there is no execution associated with it.

Execution in processor 30 is broken down into five phases to accommodate certain instructions. However, for most instructions they require only one of these phases to execute. For example, for a so-called single cycle instruction, it executes in one phase in which it computes a result and writes the result to a register. As another example, for a multiply instruction, in a first execute phase it reads operands and begins its computation and in a second execute phase it computes a result and writes the result to a register. As still another example, for a load instruction, it executes in five phases, which perform the following steps, in order: (1) compute address; (2) send address to memory; (3) access memory; (4) send data back to CPU; and (5) write data into register.

Given the preceding, one skilled in the art may now appreciate how processor 30 may implement one or more of the inventive shift and/or merge instructions detailed earlier. Specifically, each such instruction may be included in the opcode space of processor 30 and, therefore, may be a part of a program stored in, and retrieved from, memory 32. Once the instruction is fetched and dispatched, recall that it will include two data operands and an immediate value consisting of one or two arguments which define operations with respect to the two data operands. Accordingly, during execution the data operands will need to be made available for execution (e.g., from a register or memory), while the immediate value is directly accessible and does not require an additional external read. Next, the shift and/or merge instruction is executed in either the same phase as retrieval of the data operands, or in one or more additional execute phases. In any event, during this execution, either or both of the shift operation (if any) and the merge operation are specified so that the execution unit performs the operation on a granularity that is less than the number of bits in the data operands. Again, in the preferred embodiment, this granularity is on a byte basis, as defined by the 2-bit argument(s) embedded within the shift and/or merge instruction.

From the above, it may be appreciated that the present embodiments provide various inventive instructions and corresponding functionality which have in common a three operand shift and/or merge characteristic. Further, while the present embodiments have been described in detail, various substitutions, modifications or alterations could be made to the descriptions set forth above without departing from the inventive scope. For example, while the preferred implementation and resulting functionality in each of the inventive instructions set forth above calls for byte-based operations, still other alternatives may be achieved using other levels of granularity that are greater than the single-bit granularity of the prior art. For example, rather than using two 2-bit arguments to specify a location of bytes for shifting and/or merging, two 3-bit arguments could be used, or two 4-bit arguments could be used, whereby each argument thereby gives up to 8 or 16 different locations, respectively, for either a shift or merge operation. As still another example, while the preceding examples present a same number of bits for both arguments when an instruction includes two arguments, in still other variations an instruction may include a first argument with a first level of granularity and a second argument with a second and different level of granularity; indeed, in this regard, one of the two arguments could be a 5-bit argument, while the other is less than five bits, thereby still reducing the number of bits required to implement the instruction and its functionality as compared to the prior art. Still further, while the above instructions have been shown in the example of 32-bit data operands, it should be appreciated that the present teachings may apply to other sizes of data operands, where in those cases the inventive instruction and its functionality includes at least one argument that has a granularity that is greater than that required to identify each bit per the size of the data operand. Lastly, while the processor of FIG. 11 provides an example of the type of processor where the present instruction(s) and corresponding functionality may be implemented, numerous other processors could likewise implement the technology taught herein. Given these additional examples, one skilled in the art should further appreciate the inventive scope, which is defined by the following claims.

What is claimed is:

1. A method of operating a processor, comprising the steps of:
  fetching an instruction, the instruction comprising:
    an instruction opcode;
    a first data operand bit group corresponding to a first data operand;
    a second data operand bit group corresponding to a second data operand; and
    wherein at least one of the first data operand and the second data operand consists of an integer number N bits; and
    at least one immediate bit manipulation operand consisting of an integer number M bits, wherein $2^M$ is less than the integer number N;

executing the instruction, comprising the step of manipulating a number of bits of one of the first data operand and the second data operand;

wherein the number of manipulated bits is in response to the at least one immediate bit manipulation operand; and wherein the manipulating step is further in response to the instruction opcode.

2. The method of claim 1:

wherein the integer number N bits equals 32 bits; and wherein the integer number M bits equals two bits.

3. The method of claim 2:

wherein the at least one immediate bit manipulation operand consisting of an integer number M bits specifies a number of bytes; and wherein the number of manipulated bits is in response to the number of bytes.

4. The method of claim 1 wherein the at least one immediate bit manipulation operand comprises:

a first immediate bit manipulation operand consisting of the integer number M bits;

a second immediate bit manipulation operand consisting of the integer number M bits; and wherein the step of executing the instruction further comprises:

manipulating a number of bits of the first data operand in response to the first immediate bit manipulation operand; and manipulating a number of bits of the second data operand in response to the second immediate bit manipulation operand.

5. The method of claim 4:

wherein the step of manipulating a number of bits of the first data operand comprises shifting the first data operand such that a most significant bit of the first data operand is shifted in a direction toward a least significant bit location of the first data operand, wherein the first immediate bit manipulation operand specifies an extent to which the most significant bit of the first data operand is shifted in the direction toward the least significant bit location of the first data operand; and wherein the step of manipulating a number of bits of the second data operand comprises copying a portion of the first data operand, after the shifting step, over a portion of the second data operand, wherein the second immediate bit manipulation operand specifies the portion of the first data operand which is copied over the portion of the second data operand.

6. The method of claim 5:

wherein the integer number N bits equals 32 bits; and wherein the integer number M bits equals two bits.

7. The method of claim 6:

wherein the first immediate bit manipulation operand consisting of an integer number M bits specifies a number of bytes; and wherein the number of bytes in the first immediate bit manipulation specifies the extent to which the most significant bit of the first data operand is shifted in the direction toward the least significant bit location of the first data operand.

8. The method of claim 7:

wherein the second immediate bit manipulation operand consisting of an integer number M bits specifies a number of bytes; and wherein the step of manipulating a number of bits of the second data operand is in response to the number of bytes specified by the second immediate bit manipulation operand.

9. The method of claim 5 wherein the step of copying a portion of the first data operand, after the shifting step, over a portion of the second data operand comprises copying the portion of the first data operand, after the shifting step, over a least significant portion of the second data operand.

10. The method of claim 9:

wherein the integer number N bits equals 32 bits; and wherein the integer number M bits equals two bits.

11. The method of claim 10:

wherein the first immediate bit manipulation operand consisting of an integer number M bits specifies a number of bytes; and wherein the number of bytes in the first immediate bit manipulation specifies the extent to which the most significant bit of the first data operand is shifted in the direction toward the least significant bit location of the first data operand.

12. The method of claim 11:

wherein the second immediate bit manipulation operand consisting of an integer number M bits specifies a number of bytes; and wherein the step of manipulating a number of bits of the second data operand is in response to the number of bytes specified by the second immediate bit manipulation operand.

13. The method of claim 4:

wherein the step of manipulating a number of bits of the first data operand comprises shifting the first data operand of the first data operand such that a least significant bit of the first data operand is shifted in a direction toward a most significant bit location of the first data operand, wherein the first immediate bit manipulation operand specifies an extent to which the least significant bit of the first data operand is shifted in the direction toward the most significant bit location of the first data operand; and wherein the step of manipulating a number of bits of the second data operand comprises copying a portion of the first data operand, after the shifting step, over a portion of the second data operand, wherein the second immediate bit manipulation operand specifies the portion of the first data operand which is copied over the portion of the second data operand.

14. The method of claim 13:

wherein the integer number N bits equals 32 bits; and wherein the integer number M bits equals two bits.

15. The method of claim 14:

wherein the first immediate bit manipulation operand consisting of an integer number M bits specifies a number of bytes; and wherein the number of bytes specified by the first immediate bit manipulation operand specifies the extent to which the least significant bit of the first data operand is shifted in the direction toward the most significant bit location of the first data operand.

16. The method of claim 13:

wherein the second immediate bit manipulation operand consisting of an integer number M bits specifies a number of bytes; and wherein the number of bytes specified by the second immediate bit manipulation operand specifies the portion of the first data operand which is copied over the portion of the second data operand.

17. The method of claim 13 wherein the step of copying a portion of the first data operand, after the shifting step, over a portion of the second data operand comprises copying the portion of the first data operand, after the shifting step, over a portion of the second data operand as specified by the first immediate bit manipulation operand.

18. The method of claim 17:
wherein the integer number N bits equals 32 bits; and
wherein the integer number M bits equals two bits.

19. The method of claim 18:
wherein the first immediate bit manipulation operand consisting of an integer number M bits specifies a number of bytes; and
wherein the number of bytes specified by the first immediate bit manipulation specifies the extent to which the least significant bit of the first data operand is shifted in the direction toward the most significant bit location of the first data operand.

20. The method of claim 19:
wherein the second immediate bit manipulation operand consisting of an integer number M bits specifies a number of bytes; and
wherein the number of bytes specified by the second immediate bit manipulation operand specifies the portion of the first data operand which is copied over the portion of the second data operand.

21. The method of claim 4 wherein the step of executing the instruction further comprises copying a portion of the first data operand over a portion of the second data operand, wherein the first immediate bit manipulation operand specifies the portion of the first data operand which is copied over the portion of the second data operand and wherein the second immediate bit manipulation operand specifies the portion of the second data operand over which the portion of the first data operand is copied.

22. The method of claim 21:
wherein the integer number N bits equals 32 bits; and
wherein the integer number M bits equals two bits.

23. The method of claim 22:
wherein the first immediate bit manipulation operand consisting of an integer number M bits specifies a number of bytes; and
wherein the number of bytes specified by the first immediate bit manipulation operand specifies the portion of the first data operand which is copied over the portion of the second data operand.

24. The method of claim 23:
wherein the second immediate bit manipulation operand consisting of an integer number M bits specifies a number of bytes; and
wherein the number of bytes specified by the second immediate bit manipulation operand specifies the portion of the second data operand over which the portion of the first data operand is copied.

25. The method of claim 1 wherein the step of executing the instruction further comprises:
shifting the first data operand such that a most significant bit of the first data operand is shifted in a direction toward a least significant bit location of the first data operand, wherein the first immediate bit manipulation operand specifies an extent to which the most significant bit of the first data operand is shifted in the direction toward the least significant bit location of the first data operand; and shifting the second data operand such that a most significant bit of the second data operand is shifted in a direction toward a least significant bit location of the second data operand, wherein the first immediate bit manipulation operand specifies an extent to which the most significant bit of the first second operand is shifted in the direction toward the least significant bit location of the second data operand; and forming a result, following the shifting steps, comprising concatenating any bit or bits from the first data operand that are not shifted beyond the least significant bit location of the first data operand with any bit or bits from the second data operand that are shifted beyond the least significant bit location of the second data operand.

26. The method of claim 25:
wherein the integer number N bits equals 32 bits; and
wherein the integer number M bits equals two bits.

27. The method of claim 26:
wherein the first immediate bit manipulation operand consisting of an integer number M bits specifies a number of bytes; and
wherein the number of bytes in the first immediate bit manipulation operand specifies the extent to which the most significant bit of the first data operand is shifted in the direction toward the least significant bit location of the first data operand.

28. The method of claim 27:
wherein the second immediate bit manipulation operand consisting of an integer number M bits specifies a number of bytes; and
wherein the number of bytes in the second immediate bit manipulation operand specifies the extent to which the most significant bit of the first second operand is shifted in the direction toward the least significant bit location of the second data operand.

29. The method of claim 1 wherein the at least one immediate bit manipulation operand comprises:
a first immediate bit manipulation operand consisting of the integer number M bits;
a second immediate bit manipulation operand consisting of an integer number P bits, wherein the integer number P is unequal to the integer number M; and
wherein the step of executing the instruction further comprises:
manipulating a number of bits of the first data operand in response to the first immediate bit manipulation operand; and
manipulating a number of bits of the second data operand in response to the second immediate bit manipulation operand.

30. The method of claim 29 wherein $2^P$ is less than the integer number N.

31. The method of claim 1 wherein each of the first data operand and the second data operand comprises video data.

32. The method of claim 1 wherein each of the first data operand and the second data operand comprises communications data.

33. The method of claim 1 wherein each of the first data operand and the second data operand consists of the integer number N bits.

34. The method of claim 1 wherein the first data operand bit group corresponding to a first data operand comprises a register address of a register storing the first data operand.

35. The method of claim 34 wherein the data operand bit group corresponding to a second data operand comprises a register address of a register storing the second data operand.

36. The method of claim 34 wherein the data operand bit group corresponding to a second data operand comprises an immediate data value consisting of the second data operand.

37. A processor, comprising:
  circuitry for fetching an instruction;
  instruction space for storing codes for a plurality of instructions, wherein at least one of the instructions is operable to be fetched by the circuitry for fetching and comprises:
    an instruction opcode;
    a first data operand bit group corresponding to a first data operand;
    a second data operand bit group corresponding to a second data operand; and
    wherein at least one of the first data operand and the second data operand consists of an integer number N bits; and
    at least one immediate bit manipulation operand consisting of an integer number M bits, wherein $2^M$ is less than the integer number N;
  circuitry for executing the instruction, comprising circuitry for manipulating a number of bits of one of the first data operand and the second data operand;
  wherein the number of manipulated bits is in response to the at least one immediate bit manipulation operand; and
  wherein the circuitry for manipulating is further in response to the instruction opcode.

38. The processor of claim 37:
  wherein the integer number N bits equals 32 bits; and
  wherein the integer number M bits equals two bits.

39. The processor of claim 37 wherein the at least one immediate bit manipulation operand comprises:
  a first immediate bit manipulation operand consisting of the integer number M bits;
  a second immediate bit manipulation operand consisting of the integer number M bits; and
  wherein the circuitry for executing the instruction further comprises:
    circuitry for manipulating a number of bits of the first data operand in response to the first immediate bit manipulation operand; and
    circuitry for manipulating a number of bits of the second data operand in response to the second immediate bit manipulation operand.

40. The processor of claim 39:
  wherein the circuitry for manipulating a number of bits of the first data operand comprises circuitry for shifting the first data operand such that a most significant bit of the first data operand is shifted in a direction toward a least significant bit location of the first data operand, wherein the first immediate bit manipulation operand specifies an extent to which the most significant bit of the first data operand is shifted in the direction toward the least significant bit location of the first data operand; and
  wherein the circuitry for manipulating a number of bits of the second data operand comprises circuitry for copying a portion of the first data operand, after operation of the circuitry for shifting, over a portion of the second data operand, wherein the second immediate bit manipulation operand specifies the portion of the first data operand which is copied over the portion of the second data operand.

41. The processor of claim 40 wherein the circuitry for copying a portion of the first data operand, after operation of the circuitry for shifting, over a portion of the second data operand comprises circuitry for copying the portion of the first data operand, after operation of the circuitry for shifting, over a least significant portion of the second data operand.

42. The processor of claim 39:
  wherein the circuitry for manipulating a number of bits of the first data operand comprises circuitry for shifting the first data operand of the first data operand such that a least significant bit of the first data operand is shifted in a direction toward a most significant bit location of the first data operand, wherein the first immediate bit manipulation operand specifies an extent to which the least significant bit of the first data operand is shifted in the direction toward the most significant bit location of the first data operand; and
  wherein the circuitry for manipulating a number of bits of the second data operand comprises circuitry for copying a portion of the first data operand, after operation of the circuitry for shifting, over a portion of the second data operand, wherein the second immediate bit manipulation operand specifies the portion of the first data operand which is copied over the portion of the second data operand.

43. The processor of claim 42 wherein the circuitry for copying a portion of the first data operand, after operation of the circuitry for shifting, over a portion of the second data operand comprises circuitry for copying the portion of the first data operand, after operation of the circuitry for shifting, over a portion of the second data operand as specified by the first immediate bit manipulation operand.

44. The processor of claim 39 wherein the circuitry for executing the instruction further comprises circuitry for copying a portion of the first data operand over a portion of the second data operand, wherein the first immediate bit manipulation operand specifies the portion of the first data operand which is copied over the portion of the second data operand and wherein the second immediate bit manipulation operand specifies the portion of the second data operand over which the portion of the first data operand is copied.

45. The processor of claim 37 wherein the circuitry for executing the instruction further comprises:
  circuitry for shifting the first data operand such that a most significant bit of the first data operand is shifted in a direction toward a least significant bit location of the first data operand, wherein the first immediate bit manipulation operand specifies an extent to which the most significant bit of the first data operand is shifted in the direction toward the least significant bit location of the first data operand;
  circuitry for shifting the second data operand such that a most significant bit of the second data operand is shifted in a direction toward a least significant bit location of the second data operand, wherein the first immediate bit manipulation operand specifies an extent to which the most significant bit of the first second operand is shifted in the direction toward the least significant bit location of the second data operand; and
  circuitry for forming a result, after operation of the circuitry for shifting, comprising circuitry for concatenating any bit or bits from the first data operand that are not shifted beyond the least significant bit location of the first data operand with any bit or bits from the second data operand that are shifted beyond the least significant bit location of the second data operand.

* * * * *